United States Patent [19]

Loeb, Jr.

[11] 4,186,900
[45] Feb. 5, 1980

[54] DISINTEGRATABLE AERODYNAMIC BRAKE

[75] Inventor: Carl M. Loeb, Jr., New York, N.Y.

[73] Assignee: Carl M. Loeb Trust, New York, N.Y.

[21] Appl. No.: 871,615

[22] Filed: Jan. 23, 1978

[51] Int. Cl.² .................... B64C 9/32; B64G 1/20
[52] U.S. Cl. ............................ 244/113; 102/105;
  244/3.24; 244/117 A; 244/160; 244/163
[58] Field of Search ............... 244/113, 117 A, 160,
  244/162, 163, 3.24, 3.25, 3.27; 102/105, 4, 34.1,
  37.1; 239/265.15

[56] References Cited
U.S. PATENT DOCUMENTS

| | | | |
|---|---|---|---|
| 2,418,273 | 4/1947 | Moore | 244/113 X |
| 3,067,971 | 12/1962 | Dew | 244/113 |
| 3,137,995 | 6/1964 | Othmer et al. | 239/265.15 |
| 3,189,477 | 6/1965 | Shaffer | 239/265.15 |
| 3,243,313 | 3/1966 | Aves | 244/117 A X |
| 3,287,019 | 11/1966 | Arthur | 102/105 X |

Primary Examiner—Barry L. Kelmachter
Attorney, Agent, or Firm—Pennie & Edmonds

[57] ABSTRACT

A disintegratable aerodynamic brake is disclosed for use on a re-entry vehicle for retarding vehicle speed upon re-entry. The brake is connected to the travelling vehicle and is fabricated from a refractory material and is configured to progressively fuse and disintegrate as it becomes heated by friction as the vehicle encounters increasing atmospheric resistance upon reentry thereinto, so as to retard vehicle speed.

13 Claims, 5 Drawing Figures

DISINTEGRATABLE AERODYNAMIC BRAKE

BACKGROUND OF THE INVENTION

1. Field of the Invention

In general, this invention pertains to an apparatus which serves to reduce vehicle speed by inducing drag. More specifically, it relates to a disintegratable aerodynamic brake which generally retards speed of a vehicle re-entering the earth's atmosphere.

2. Description of the Prior Art

Heretofore, drag flaps attached to wing assemblies of subsonic aerodynamic vehicles have induced drag for purposes of reducing vehicle speed. An example of such type of drag flap is described in U.S. Pat. No. 2,418,273. With the advent of modern airborne vehicles re-entering the earth's atmosphere at velocities in excess of ten thousand miles per hour, in order to keep the vehicle itself at as low a maximum temperature as possible, it becomes advisable to construct drag flaps which would significantly reduce such velocities during re-entry while at the same time maintain vehicle maneuverability. However, conventional subsonic flap constructions are incapable of performing in the intended manner whenever subject to the intense temperature and pressure conditions encountered during re-entry.

Efforts have been made to provide supersonic vehicles with suitable drag inducing devices which are capable of providing suitable speed reductions when returning from a near space type environment. Illustrative of this kind of drag flap is one described in U.S. Pat. No. 3,067,971. The disclosed drag flap construction, while reducing vehicle velocity during descent from high altitudes and enabling satisfactory maneuverability of vehicle, is, however, incapable of successfully controlling the significant temperature increases from affecting the vehicle. Control of such extremely high temperatures is an important consideration for re-entry vehicles, especially if the vehicle is manned, such as a space shuttle. Aside from the foregoing significant drawback, drag flaps of the above-noted category which experience the noted extreme conditions during re-entry into the atmosphere from space may be unreliable for repeated use because of heat damage or induced stresses and strains. In this regard, after each re-entry they would have to be inspected to determine their structural integrity. Such inspection and maintenance would be costly. Further, conventional drag flaps might not be entirely reliable, particularly after repeated use. It should be noted that the reusability of a spacecraft and its components after re-entry has become a significant subject in view of the proposed use of space shuttles which would repeatedly enter the earth's atmosphere.

It will, therefore, be appreciated that conventional drag flap constructions for supersonic airborne vehicles are not effective, economical, or reliable for use on re-entry vehicles.

SUMMARY OF THE INVENTION

It is an object of the present invention to overcome the several disadvantages associated with known prior art drag flap constructions by providing a disintegratable aerodynamic brake which serves to gradually retard re-entry vehicle speed while re-entering the earth's atmosphere.

Broadly described, the present invention is directed to a disintegratable aerodynamic brake for use on a re-entry vehicle for retarding vehicle speed upon re-entry into the earth's atmosphere from space. This brake comprises a thin, stiff sheet-like member attached to the vehicle and projecting from an outer surface thereof. The brake presents a surface of substantial area which is curved concavely toward the direction of vehicle travel from an inner leading edge portion adjacent the region of attachment to the vehicle to an outer trailing edge portion extending substantially perpendicularly to the direction of vehicle travel. The brake is fabricated from a refractory material which fuses and disintegrates progressively from its outer edge toward its inner edge at elevated temperatures generated in response to encountering increasing atmospheric resistance upon re-entry of the vehicle into the atmosphere.

BRIEF DESCRIPTION OF THE DRAWING

The above and other objects, features and advantages of the present invention will become readily apparent after reading a detailed description thereof when viewed in conjunction with the accompanying drawing, wherein.

DETAILED DESCRIPTION

Figure 1:
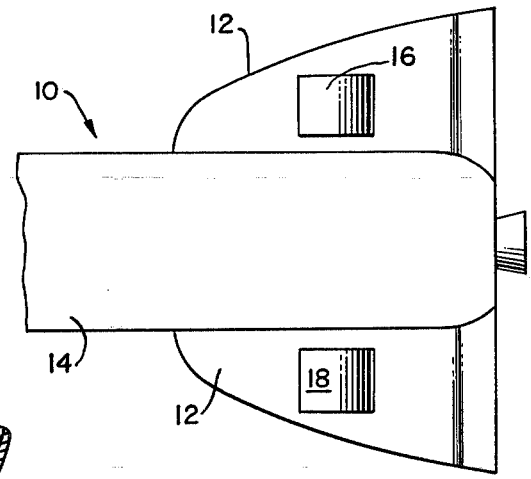
FIG. 1 is a schematic plan view illustrating the aerodynamic brake embodying the principles of the present invention and shown attached to a wing structure of a re-entry vehicle.
Figure 2:
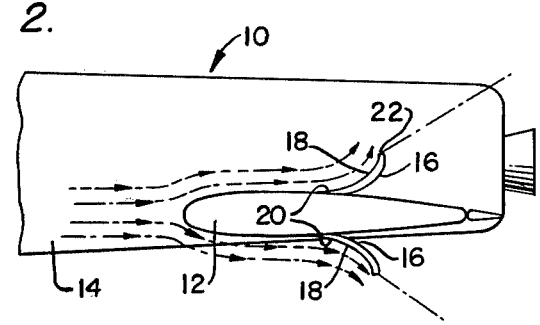
FIG. 2 is a schematic side view illustrating in greater detail the structure and operational arrangement of the aerodynamic brake in relation to the wing structure.
Figure 3:
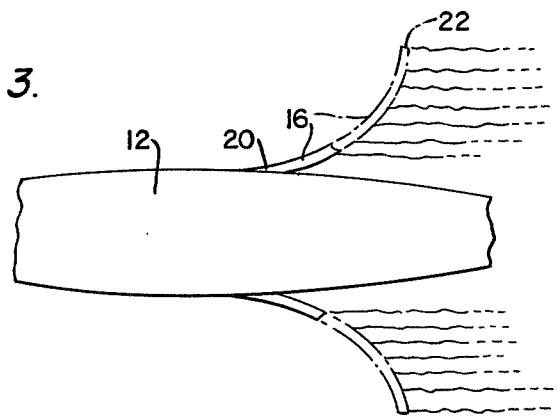
FIG. 3 illustrates an aerodynamic brake of the present invention in the process of disintegrating during re-entry.

FIGS. 1 to 3 depict one embodiment of the present invention. As seen, there is a segment of a re-entry vehicle 10, such as a space shuttle, which is designed to re-enter the earth's atmosphere at velocities in excess of ten thousand miles per hour. A pair of aerodynamic wings 12 are, in suitable fashion, attached to the fuselage 14. Wing structures 12 serve the customary purposes of, inter alia, facilitating the necessary aerodynamic lift and maneuverability whenever the vehicle is to be landed on earth. It will be understood, of course, that the depicted wing contruction is only for purposes of illustration and not limitation.

Attached to each wing 12, in immovable fashion, is a pair of disintegratable aerodynamic brakes 16 which are made in accordance with the spirit and scope of the present invention. The destructable brakes 16 can be suitably immovably attached in symmetrical fashion to top and bottom surfaces of each wing 12. Aerodynamic brakes 16 extend generally outwardly from the wing in the manner depicted so as to induce drag upon re-entry.

It will be seen that each aerodynamic brake 16 is constructed from a single, thin and continuously formed sheet-like member having a suitable aerodynamic curved profile which serves to induce drag. The brake 16 presents a smooth surface 18 of substantial area which is formed with a concavely curved surface facing in the direction of vehicle travel. The brake extends from an inner leading edge portion 20, adjacent the region of attachment to re-entry vehicle 10, to an outer trailing edge portion 22 extending substantially perpendicularly to the direction of vehicle travel. Although the brake 16 is affixed to the wing 12, it will not act as an obstacle to detrimentally affect the vehicle's much slower travel upon take-off and departure from the earth's atmosphere. The particular curved profile is selected in accordance with well-known aerodynamic principles for purposes of providing the desired drag characteristics without sacrificing needed stability and maneuverability of the re-entry vehicle 10.

It will be appreciated, of course, that as a consequence of induced drag the vehicular velocity is appropriately gradually retarded upon re-entry into the atmosphere. It should be noted that one reason the brakes 16 are placed on the top and bottom surfaces of both wing structures 12 is to avoid loss of vehicle control in flying through the atmosphere. In this regard, however, the lower brake might require a different profile curve because of the slip stream around wing structure 12. The particular curved profile, brake structure, and brake location depicted are for purposes of illustration and not limitation.

The brake 16 is fabricated from a refractory material which fuses and disintegrates in response to high temperatures generated upon re-entry. In accordance with known aerodynamic principles, the type of brake curvature affects the temperature the brake surface experiences upon re-entry. Accordingly, the curvature, besides being preselected to control drag, also serves to partially control the brake surface temperature. Since the strength and rate of disintegration for the refractory materials are predictable, they are appropriately preselected to withstand the extreme re-entry forces and conditions. In this connection, the brake 16 materials and curvature are appropriately selected, sized and configured so that the brake melts at preselected temperatures whenever the vehicle re-enters the atmosphere after pre-selected time periods and at predetermined relative velocities relative to the atmosphere it encounters. In this regard, FIG. 3 shows the progressive disintegration process of brake 16. The brakes 16 are shaped to fuse first at the outer trailing edge portion 22 and then progressively melt towards the inner portion 20 as a result of the heat which increases as the brake encounters greater friction from the progressively denser atmosphere. A result of such gradual disintegration is that the undisintegrated portion continues to act as a residual brake. Also, as brake 16 melts, its attitude toward the air flow will be reduced as air pressure increases. Accordingly, its affect on vehicle maneuverability is diminished. The present invention contemplates that the brakes 16 can partially or completely disintegrate.

It should be pointed out that FIG. 3 is presented for purposes of illustrating the disintegration and is not to be understood as showing the precise manner of disintegration. As noted, the brake 16 will be constructed to remain effective for as long as necessary, before completely disintegrating, or being so reduced so as not to interfere with landing operations.

Figure 4A:
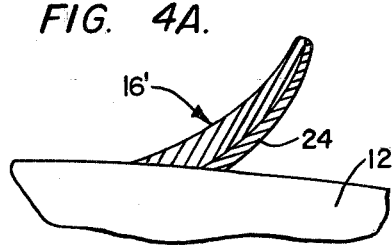
FIG. 4A is a schematic side view, partly in section, of an alternate embodiment of the disintegratable aerodynamic brake.
Figure 4B:
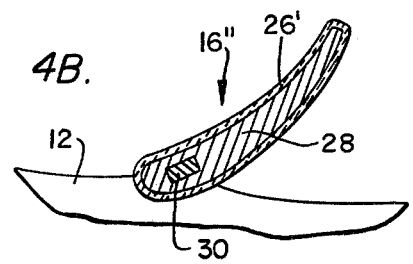
FIG. 4B is a schematic side view, partly in section, illustrating another embodiment of the present invention.

As to the preferred types of refractory materials envisioned by the invention, molybdenum may be used alone, or in combination with a thin beryllium strip 24 suitably attached to the molybdenum to form a laminate brake structure 16', such as shown in FIG. 4A. A ceramic coating 26' may be used for at least partially covering the metallic base 28 to form brake 16" as shown in FIG. 4B. Ceramic coating 26' serves the purpose of enhancing erosion resistance of the brake surface. Cermets or even ceramics, if made tough enough to serve effectively, could well be the most preferred material for the entire brake structure.

FIG. 4B also shows that the brake 16" may be suitably hinged by a rod 30 to the wing structure 12 for rotation. Appropriate mechanisms (not shown) can rotate brake 16 to a desired position so as to make it less of an obstacle on take-off. The brake 16 can be also connected to the wing structure 12 so that it can be jettisoned if necessary.

The disintegratable drag brakes can only be used once. This represents a significant advantage over any other type of drag flap, particularly in those situations wherein a vehicle will be making multiple re-entries from a space environment.

It will be appreciated that the present invention provides for a simply constructed, disintegratable aerodynamic brake which serves to gradually retard the speed of a re-entry vehicle. Since the new aerodynamic brake disintegrates, there is no need for constant inspection and maintenance as might be the case with other types of drag flaps on a re-entry vehicle which re-enters the earth's atmosphere a plurality of times.

What is claimed is:

1. A disintegratable aerodynamic brake for use on a vehicle in a relation of symmetry with another brake for retarding vehicle speed upon re-entry into the earth's atmosphere from space, said brake in the form of a thin, stiff sheet-like member fabricated from a refractory material, said brake presenting a surface of substantial area which is curved concavely toward the direction of vehicle travel and including an inner leading edge portion adapted to be attached to the vehicle and an outer trailing edge portion extending substantially perpendicularly to the direction of vehicle travel, said material of said brake capable of fusing and disintegrating from its outer trailing edge portion progressively toward its inner leading edge portion at a rate substantially equal to the rate said other brake fuses and disintegrates as a consequence of elevated temperatures generated in response to encountering increasing atmospheric resistance upon re-entry of the vehicle from space into the atmosphere thereby to retard the speed of said vehicle.

2. The brake as set forth in claim 1 wherein the refractory material of which it is fabricated is molybdenum.

3. The brake as set forth in claim 1 wherein the refractory material of which it is fabricated is a combination of molybdenum and beryllium.

4. The brake as set forth in claim 1 wherein the material of which it is fabricated comprises at least partially a refractory ceramic.

5. The brake as set forth in claim 1 wherein the refractory material of which it is fabricated is a cermet.

6. In combination: a vehicle which is adapted to travel at high velocities through space having a pair of opposed aerodynamic wing structures attached thereto; and a disintegratable aerodynamic brake mounted on each of said wing structures in symmetrical relation for retarding vehicle speed upon re-entry from space into the earth's atmosphere, each said brake having the form of a thin, stiff sheet-like member fabricated from a refractory material, each said brake presenting a surface which faces in the direction of vehicle travel and extends along a concave path from an inner leading edge portion adjacent said wing structure to an outer trailing edge portion spaced substantially from said wing structure, each said brake because of its curvature fusing and disintegrating from said outer trailing edge portion progressively and substantially equally toward said inner leading edge portion as said vehicle speed is retarded from said high velocity by encounter with progressively increasing atmospheric resistance in the denser earth atmosphere.

7. In the combination of claim 6, said brakes being fabricated of molybdenum.

8. In the combination of claim 6, said brakes being fabricated from a combination of molybdenum and beryllium.

9. In the combination of claim 6, said brakes being at least partially fabricated of a refractory ceramic.

10. In the combination of claim 6, said brakes being fabricated of a cement.

11. in the combination of claim 6, wherein said vehicle has a plurality of disintegratable aerodynamic brakes mounted symmetrically on both the top and bottom surfaces of said opposed aerodynamic wing structures.

12. In the combination of claim 11 wherein the curvature of said brakes mounted on the top surface are similar and the curvature of the brakes mounted on the lower surface of the wing structures are similar.

13. In the combination of claim 6, including mounting means for mounting each said brake to said wing structure, said mounting means adapted to be controlled and, in turn, to control the particular attitude of each said brake relative to the direction of vehicle travel.

* * * * *

UNITED STATES PATENT AND TRADEMARK OFFICE
CERTIFICATE OF CORRECTION

PATENT NO. : 4,186,900
DATED : February 5, 1980
INVENTOR(S) : Carl M. Loeb, Jr.

It is certified that error appears in the above-identified patent and that said Letters Patent are hereby corrected as shown below:

Column 6, line 2, "cement" should be --cermet--.

Signed and Sealed this

Twenty-seventh Day of May 1980

[SEAL]

Attest:

SIDNEY A. DIAMOND

Attesting Officer  Commissioner of Patents and Trademarks